Sept. 15, 1959     C. W. SCHREIBER     2,904,161
GLASSWARE TRANSFER MECHANISM

Filed Dec. 10, 1956     2 Sheets-Sheet 1

INVENTOR.
CARL W. SCHREIBER
BY J. R. Nelson and
Leonard D. Soubier
ATTORNEYS

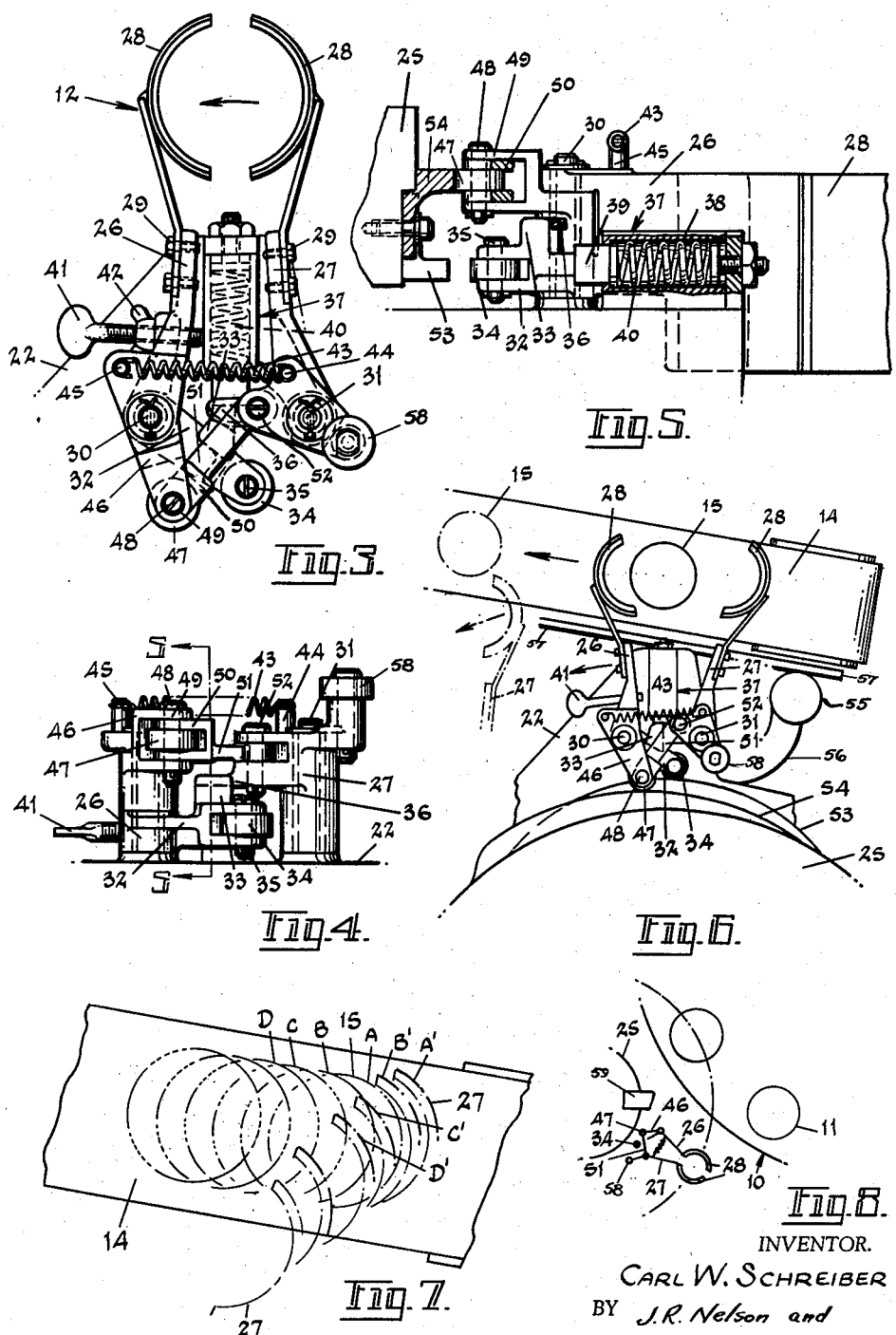

United States Patent Office 2,904,161
Patented Sept. 15, 1959

2,904,161

GLASSWARE TRANSFER MECHANISM

Carl W. Schreiber, Toledo, Ohio, assignor to Owens-Illinois Glass Company, a corporation of Ohio Application December 10, 1956, Serial No. 627,181

12 Claims. (Cl. 198—25)

This invention relates to improvements in mechanisms for transferring articles of glassware, such as tumblers, stemware, bottles, jars or the like from a moving carrier of such articles to a moving horizontal conveyor, and more particularly to an article transfer device of the class described for transferring such articles from a forming machine, which is generally rotating about a vertical axis, onto a horizontal conveyor in a single file and uniformly spaced order.

In mechanisms of this type used heretofore, the ware is received from the molds of a continuously rotating forming machine by pairs of horizontally co-acting transfer arms and a vertically aligned dead plate which are carried on a continuously rotating turret. The transfer arms are actuated to open and close about the ware at a given position of rotation of the forming machine and once the ware is received, it rests on the dead plate. The forming machine has a given number of molds spaced about the periphery of the machine and the turret of the transfer mechanism has a proportionate number of pairs of transfer arms to receive ware from each mold, the number of pairs of arms depending on the radii and the rotational speeds of the two rotating elements. The rotating turret and forming machine are spaced such that they are tangent at the point the ware is to be received by the transfer arms of the turret. The two elements, turret and forming machine, are rotated in opposite directions and synchronized, so that as each ware laden mold reaches this point of tangency, an unladen pair of transfer arms carried on the rotating turret is vertically aligned with the ware at that position and the arms are actuated to receive the ware from the mold. After receiving the ware, the transfer arms uphold it until transferred by the rotating turret to the point where it is released onto a straight line conveyor. The conveyor runs tangent to the ware at the ware releasing position of the transfer arms and is slightly below the level of the dead plate. The ware carried by each pair of transfer arms is released therefrom by opening them horizontally sufficiently to deposit the ware on the conveyor for travel to another location for further manufacture.

In the prior art, the transfer arms are opened at the ware releasing position just sufficiently to allow it to be deposited onto the conveyor belt. The lineal speed of the conveyor belt must be sufficient to move the deposited ware out of the way of the hindmost or trailing arm of the pair of transfer arms which released the ware. This lineal speed must be substantially equal to the peripheral speed of the transfer arms. If the conveyor is traveling at a slower speed, the trailing arm, which is traveling faster, will catch up to the ware and upset it or knock it from the conveyor. Accordingly, the spacing between ware deposited onto the conveyor is limited to substantially the arcuate distance between centers of the transfer arms. By way of example, if the arcuate spacing between centers of the transfer arms is 25 inches and the lineal speed of the conveyor belt and peripheral speed of the transfer arms are equal, the spacing between ware on the conveyor must be 25 inches.

In the production of table ware, for example, it is advantageous to cool the formed ware considerably before delivery to a burn-off machine. In the above example, the amount of cooling will depend as a function of the time the ware is on the conveyor. If speed of the conveyor is limited to peripheral speed of the transfer mechanism, the one remaining variable to lengthen cooling time of the ware is increased conveyor length.

It is, therefore, an object of this invention to provide an improved transfer mechanism, which will permit a reduced conveyor speed, and thereby increase cooling time for the ware carried over a given conveyor length.

Another object of this invention is to provide an improved transfer mechanism which will permit closer spacing of ware delivered to the conveyor and more efficient cooling while carried thereon.

Another object of the invention is to provide an improved transfer mechanism wherein the trailing arms of a given pair of transfer arms, on releasing ware to the conveyor, are actuated to maintain a spaced relationship between the respective trailing arm and the released ware.

Still another object of the invention is to provide a safety device to insure closing the transfer arms prior to receiving ware from a forming machine mold to prevent any interference therebetween as the transfer arms and mold converge on the ware receiving point.

The specific nature of this invention, as well as other objects and advantages thereof, will become apparent to those skilled in the art from the following detailed description, taken in conjunction with the annexed sheets of drawings on which, by way of preferred example only, is illustrated one embodiment of this invention.

In the drawings:

Fig. 3 is a plan view of one pair of transfer arms and actuating mechanism assembly of this invention.

Fig. 4 is an end elevational view of the transfer arm assembly shown in Fig. 3.

Fig. 5 is a side elevational view, partly in section, taken along line 5—5 in Fig. 4.

Fig. 6 is a plan view showing one pair of transfer arms and actuating assembly in operating position after depositing an article of ware onto a straight-line conveyor.

Fig. 7 is a plan view, similar to Fig. 6, illustrating the successive rotated positions of the transfer arms in relation to ware after it is deposited on the straight-line conveyor.

Fig. 8 is a plan view, schematically illustrating the safety device for closing the transfer arms prior to receiving ware from the forming machine molds.

Figure 1:
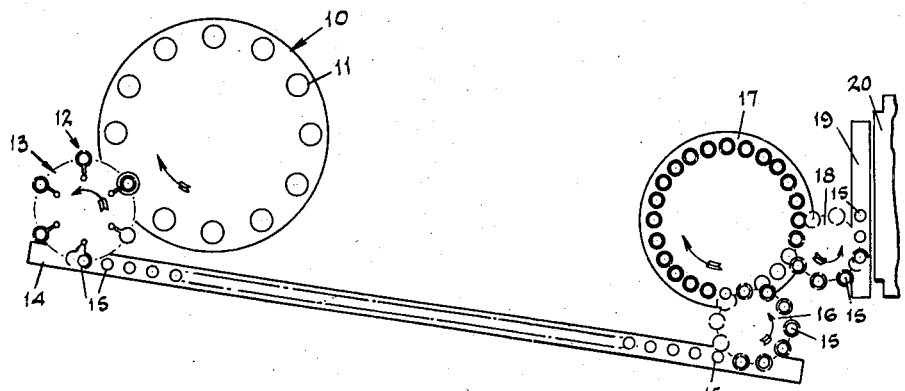
Fig. 1 is a schematic plan view showing the transfer of ware from a rotating forming machine, through the improved transfer apparatus of this invention, and deposit onto a straight-line conveyor for travel through a burn-off machine and into a lehr.

In Fig. 1, a rotating forming machine 10 having, by way of example, twelve equally spaced molds 11 around the periphery thereof, which are depositing ware formed therein to corresponding transfer arm assemblies referred to generally by numeral 12, a plurality of which are equally spaced about the periphery of a rotating portion of a transfer mechanism indicated generally at 13. The transfer arms 12 carry the received ware to a straight-line conveyor 14 spaced horizontally from forming machine 10 and spaced vertically from aligned transfer arms 12 sufficiently to receive ware 15 thereon. Ware deposited on conveyor 14 is transferred to a similar transfer mechanism 16 which delivers it to a burn-off machine 17. After passing through various operations performed around the periphery of the rotating burn-off machine 17, the ware is then received by another transfer mechanism 18 and deposited onto a conveyor 19 which transfers it onto an adjacent lehr apron 20.

Figure 2:
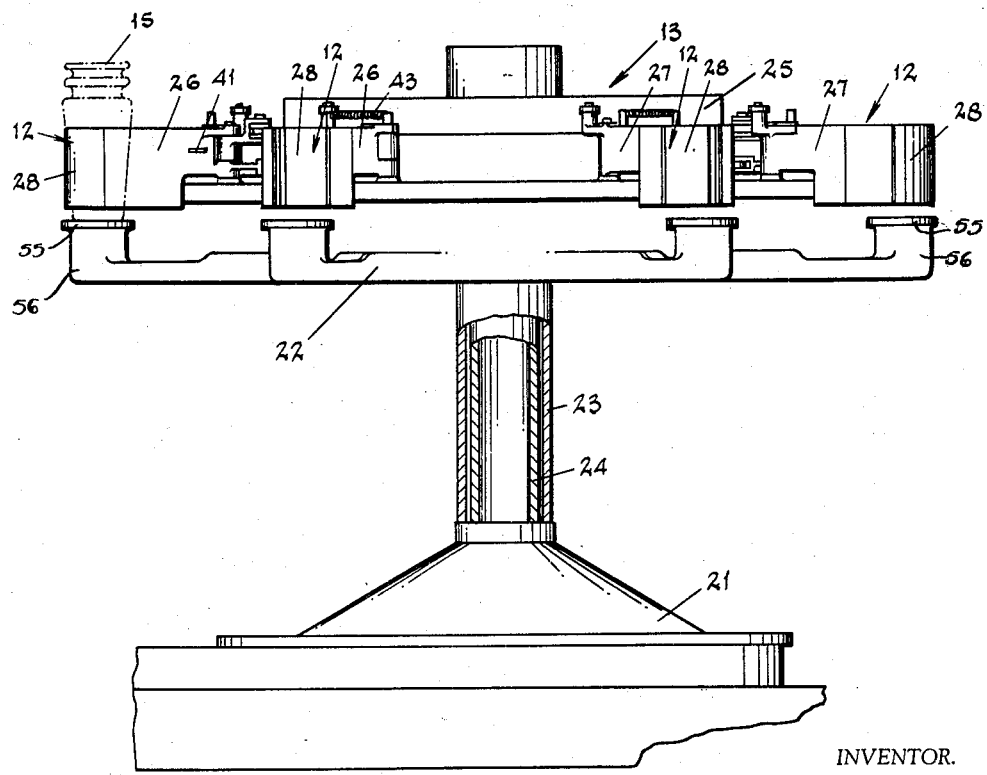
Fig. 2 is an elevational view, partly in section, of the transfer mechanism incorporating the invention therein.

Referring now to Fig. 2, transfer mechanism 13 is shown having supporting base 21 which houses a bull gear and drive chain (not shown) for driving rotatable turret 22 in one direction. Rotatable turret 22 is mounted on a vertical drive shaft 23, which is operatively connected to the aforementioned bull gear, and thereby provides a driving connection for turret 22. Through this drive connection, turret 22 is synchronized, in a conventional manner, with the rotational speed of forming machine 10 (Fig. 1). A cylindrical support member 24 is rigidly attached to base 21 and supports a stationary upper base member 25. About the periphery of turret 22 are a plurality of equally spaced pairs of transfer arms 12. Below each pair of transfer arms 12 is a dead plate 55 carried on pivotal arm 56. Arm 56 is pivoted on turret 22 and is normally held radially outward to align dead plate 55 vertically under transfer arms 12. Dead plate 55 has several vertical bores which communicate with an air passage (not shown) through arm 56. Air is forced through this air passage in arms 56, through the holes in dead plate 55 and against ware 15 to cool it during transfer.

The figures show a radius relationship between turret 22 and forming machine 10 which is 2 to 1, therefore, turret 22 is rotated at twice the speed of forming machine 10 to provide proper synchronization. On the drawings, six equally spaced pairs of arms 12 (Fig. 1) are shown, by way of example, to correspond with the twelve molds 11 spaced around forming machine 10.

The above described radii of the cooperating rotatable elements, speed of rotation thereof, and relationship between number of molds and transfer arms are illustrated as a workable example, however, it should be understood that any number of other relationships may be worked out for satisfactory synchronization of the two rotatable elements.

The relationship between radii, number of mold parts and transfer arms and relative rotary speeds of the elements 10 and 13 are pertinent to this invention only insofar as they provide synchronization between molds 11 successively delivering their articles of ware to transfer arms 12 at a given transfer point in the rotation of forming machine 10 and transfer mechanism 13.

Referring now to Figs. 3, 4 and 5, it is seen that, in viewing the pair of transfer arms 12 from above as they are rotated counterclockwise (to the left in Fig. 3), transfer arms 12 comprise a leading arm 26 and trailing arm 27. Outwardly of each of the transfer arms 26 and 27 is provided a detachable ware-upholding member 28 predetermined to conform to the general shape of the ware being transferred. These ware-upholding members 28 are removable at cap screws 29 for exchange by other shapes of ware-upholding members. Hereinafter, reference made to either leading transfer arm 26 or trailing transfer arm 27 or pair of transfer arms 12 includes, as an integral part thereof, ware-upholding members 28, unless otherwise specified.

Transfer arms 26 and 27 are pivoted on pins 30 and 31, respectively, which are rigidly connected onto turret 22. Leading arm 26 has a bell crank extension 32 integral therewith which is provided with an outwardly facing lug 33. Roller 34 is pin connected to the end of bell crank 32 by pin 35, and serves as a cam follower riding on cam 53 carried by upper base member 25, as will be more particularly described hereinafter. Trailing arm 27 has a matching lug 36 which engages lug 33. Lug 36 is held engaged with lug 33 by force of compression spring 40 of spring assembly 37. Spring assembly 37 is situated between pivots 30 and 31 to align horizontally with lug 36 and comprises a housing 38 (Fig. 5) provided with an end plunger 39. Spring 40 is compressed between the end of plunger 39 and the outer end of housing 38 to tend to rotate trailing arm 27 counterclockwise (Fig. 3). Lug 36 engages lug 33 to tend to rotate leading arm 26 clockwise about its pin 30. Thus, it is seen that spring assembly 37 tends to normally retain transfer arms 26 and 27 closed. An adjustable screw 41, is threaded transversely through leading arm 26 to bear against housing 38 of spring assembly 37. Adjustable screw 41 is held at its desired setting by lock wing nut 42 provided thereon. Accordingly, by adjusting screw 41, the desired spacing between ware-upholding members 28 may be achieved by opposing spring 40, which tends to rotate transfer arms 26 and 27 towards each other. An additional closing force is provided by helical spring 43 fastened at one end by pin 44 on trailing arm 27 and at the other end on pin 45 of leading arm 26. Bell crank 46 is journaled on pin 30 to override leading arm 26 connected thereon. Roller 47, which acts as a rotatable cam follower, is pin connected at the outer end of bell crank 46 by a pin 48 extending through yoke 49. Pin 48 extends through yoke 50 of link 51 inserted in yoke 49 to connect one end of link 51 with roller 47. The other end of link 51 is connected to trailing arm 27 at pin 52.

Springs 40 and 43 normally hold the transfer arms 26 and 27 in closed position, during which time cam followers 34 and 47 ride on depressed portions of annular cam tracks 53 and 54, respectively (Fig. 6), mounted on the outer periphery of upper base member 25. During counterclockwise rotation of turret 22, cam followers 34 and 47 each ride over raised portions on cams 53 and 54 to provide actuation for opening transfer arms 26 and 27 as each pair of transfer arms 12 reach their position during rotation of turret 22, for receiving ware from molds 11 of forming machine 10 (Fig. 1). Cam 53 is provided with a raised portion proximate to the ware receiving point to actuate cam follower 34 outwardly, which in turn rotates bell crank 32 and its integral leading arm 26 counterclockwise about pin 30. The outwardly facing lug 33 on bell crank 32 is likewise rotated, and through its engagement with its matching lug 36, rotates trailing arm 27 clockwise against the compression of spring 40. Cam 53 is developed to provide sufficient actuation to open each pair of transfer arms 12 to receive ware being delivered to it by a corresponding mold 11 when both are at the ware receiving position of transfer arms 12. The ware, when received, is deposited on deal plate 55 (Fig. 2).

After cam follower 34 has passed this raised portion of cam 53, springs 40 and 43 rotate transfer arms 26 and 27 in opposite directions to return them to their closed position, thereby upholding the ware delivered therebetween.

After turret 22 has rotated to a position proximate to the desired point of releasing the ware for deposit on conveyor 14 (Fig. 6), dead plate 55 engages guide rail 57 along the side of conveyor 14 and arm 56 is pivoted counter to the rotation of turret 22. Ware-upholding members 28 continue to travel over conveyor 14 and slide ware 15 from dead plate 55 onto conveyor 14 under guidance of the transfer arms. At approximately the time ware 15 reaches conveyor 14 so as to be supported thereon, cam follower 34 again engages a comparable raised portion of cam 53 to reopen transfer arms 26 and 27 together by the previously described actuation of roller 34, bell crank 32, and lugs 33, 36. After arms 26 and 27 are both opened to free ware 15, cam follower 47 rides over a raised portion of cam 54 which shifts it outwardly. This motion forces link 51 outwardly and toward trailing arm 27 (to the right in Fig. 3). Trailing arm 27 is thereby rotated clockwise against the force of spring 40. The amount of this rotation is defined by the development of cam 54 which overlaps cam 53, and as the pair of transfer arms 12 travel past the point where ware 15 is deposited onto conveyor 14, the trailing arm 27 is opened by clockwise rotation beyond that imparted to it by the co-action of cam follower 34 and cam 53. Trailing arm 27 is thus rotated sufficiently to maintain the spaced relationship between it and the ware delivered to conveyor 14 by the development of cam 54 along the direction of rotation of turret 22, so that there will be no interference between the deposited ware 15 and any part of trailing arm 27. This non-interfering relationship may be traced through the progressive steps of motion of the deposited ware 15 on conveyor 14 at its successive positions A, B, C and D and corresponding positions A', B', C' and D' of trailing arm 27, which are illustrated in Fig. 7. After the trailing arm 27 has rotated past the point where any interference might normally occur between it and the ware deposited on and carried by conveyor 14, cam 54 again recesses and springs 40 and 43 are permitted to return transfer arms 26 and 27 to their closed position. Also, after dead plate 55 is rotated past guide rail 57, it is again rotated to align under its respective pair of transfer arms 12.

In the event springs 40 and 43 are broken during operation, a safety device for closing transfer arms 26 and 27 is provided, as is seen in Fig. 8. As the transfer arms approach the periphery of the arc of travel of molds 11, the arms 26 and 27 must be closed to avoid interference with the molds 11 as they and the transfer arms converge on their way to the point of transfer of the ware from mold 11 to ware-upholding members 29. To insure closing, a cam roller 58 (Figs. 3, 4 and 6) is pivotally connected to the innermost end of trailing arm 27. A cam plate 59 (Fig. 8) is mounted on upper base member 25 in the line of travel of cam roller 58 and will engage roller 58 at the point of rotation of transfer arms 26 and 27 where it is desired to insure said transfer arms be closed. When roller 58 rides outwardly on cam plate 59, trailing arm 27 is rotated counterclockwise, and lug 36 (Fig. 3) of trailing arm 27 is engaged with lug 33 to in turn impart clockwise rotation to bell crank extensions 32 and leading arm 26. In this manner, leading and trailing arms 26 and 27 are rotated towards each other to assume their closed position. Cam plate 59 (Fig. 8) is sufficiently long to hold the arms 26 and 27 closed until they pass any possible point of interference with molds 11. Then the arms are released by cam 59—58 to permit their opening by cam 53 for receiving ware from molds 11, as previously described. The operator will have sufficient time to detect the malfunction of closing springs 40 and 43 and stop the machine for repairs. This safety device eliminates any breakage or damage to the mechanism or molds by eliminating interference occurring therebetween due to either arm 26 or 27 being open as they and mold 11 converge on their travel toward the ware receiving point.

The speed of travel of conveyor 14 may be varied, yet the motion of trailing arm 27 will not interfere with ware deposited on conveyor 14. As turret 22 rotates through one complete revolution, each pair of transfer arms 12 are actuated through two complete opening and closing cycles, described above, to respectively receive and release ware at spaced positions along their path of movement.

Thus, it is seen that this invention provides a means for maintaining a spaced relationship between the trailing transfer arm and the delivered ware being carried on the conveyor regardless of conveyor speeds or ware spacings. In this manner, the conveyor speed may be decreased over the speed heretofore required and will thereby permit ware to be more closely spaced and retained on the conveyor a longer period of time. This closer spacing and increased time of traveling permits a better and more efficient cooling of the ware before delivery to the next operation, which is so often essential to the production of good quality glass ware.

Furthermore, conveyor speed may be decreased to accommodate more readily some subsequent transfer operation to another step in carrying out the manufacturing process being performed, such as transfer to a burn-off machine (Fig. 1).

Various modifications may be resorted to within the spirit and scope of the appended claims.

I claim:

1. Apparatus for transferring glassware between ware receiving and ware releasing positions, the linear speeds of the ware after release being less than its linear speed during transfer, comprising a base, a horizontal turret continuously rotatable on said base, a plurality of pairs of transfer arms pivoted horizontally on radially spaced centers near the periphery of said turret, said pairs of transfer arms including a leading arm and a trailing arm adapted to assume opened and closed positions relative to each other, each said pair of transfer arms adapted to uphold ware therebetween when closed, a dead plate cooperating with each said pair of transfer arms for resting said received ware thereon during transfer, means for normally maintaining each of said pairs of transfer arms closed, a first cam follower carried by each of said leading transfer arms, a cam engageable with said first cam followers proximate to each of the said ware receiving and ware releasing positions for actuating said leading transfer arms to open, means operatively connecting the leading arm to the trailing arm of each of said pairs of transfer arms actuable to open its trailing arm responsive to said actuation of its leading arm, a second cam follower operatively connected to each said trailing arm, and an overlapping cam engageable with said second cam followers proximate to said ware releasing position adapted to open said trailing arms beyond the actuation thereof provided by said first cam followers to slow the linear speed of each trailing arm to substantially that of the released ware, whereby to maintain a spaced relationship between the released ware and the corresponding trailing arm.

2. The combination defined in claim 1, wherein the means operatively connecting the leading and trailing arms for opening said trailing arm beyond the actuation provided by the first cam followers comprises a bell crank member pivoted on a center parallel with the leading arm pivot and carrying the second cam follower a link operatively connecting each said second cam follower and the corresponding trailing arm at a point thereon spaced from its pivotal center.

3. The combination defined in claim 1, including a third cam follower carried by each said trailing arm and a cam engageable with said third cam followers, intermediate the ware releasing and ware receiving positions for closing each said pair of transfer arms prior to engagement of each said first cam follower with its actuating cam proximate to the ware receiving position, whereby to provide an auxiliary means for closing each said pair of transfer arms.

4. Apparatus for transferring glassware received at a predetermined ware receiving position to a predetermined ware releasing position for delivery thereat to a traveling conveyor, the latter traveling at a linear speed less than the linear speed of the ware at the ware receiving position, said apparatus comprising a base, a horizontal turret continuously rotatable on said base, a plurality of spaced pairs of transfer arms pivoted horizontally on radially spaced centers near the periphery of said turret, said pairs of transfer arms including a leading arm and a trailing arm adapted to assume open and closed positions relative to each other, each said pair of transfer arms adapted to uphold glassware therebetween when closed, means for normally maintaining said pairs of transfer arms closed, means actuable to open said arms and release glassware therefrom, and separate means operable for pivoting said trailing arm, said separate means being engageable after actuation of said last-mentioned means and adapted to slow the linear speed of said traveling arm sufficiently to maintain a spaced relationship between said released ware on the conveyor and said trailing arm.

5. Apparatus for transferring glassware received at a predetermined ware receiving position to a predetermined ware releasing position for delivery thereat to a conveyor belt, said apparatus comprising a base, a horizontal turret continuously rotatable on said base, a plurality of spaced pairs of transfer arms pivoted horizontally on radially spaced centers near the periphery of said turret, said pairs of transfer arms including a leading arm and a trailing arm adapted to assume open and closed positions relative to each other, each said pair of transfer arms adapted to uphold glassware therebetween when closed, means for normally maintaining said pairs of transfer arms closed, means actuable to open said arms and release glassware therefrom, separate means adapted to maintain a spaced relationship between said released ware and said trailing arm, and auxiliary means, independent of said last-mentioned closing means, for closing said pairs of arms after they have cleared said released ware and before they arrive at the ware receiving position.

6. Apparatus for transferring glassware received at a predetermined ware receiving position to a predetermined ware releasing position comprising a base, a horizontal turret continuously rotatable on said base, a plurality of spaced pairs of transfer arms pivoted horizontally on radially spaced centers near the periphery of said turret, said pairs of transfer arms including a leading arm and a trailing arm adapted to assume open and closed positions relative to each other, each said pair of transfer arms adapted to uphold glassware therebetween when closed, means for normally maintaining said pairs of transfer arms closed, means actuable to open said arms and release glassware therefrom, separate means adapted to maintain a spaced relationship between said released ware and said trailing arm, and auxiliary means, independent of said last-mentioned closing means, for closing said pairs of arms after they have cleared said released ware and before they arrive at the ware receiving position.

7. A continuously rotating ware transfer mechanism adapted to receive ware from a continuously rotating ware carrying element and release it to a conveyor, said transfer mechanism comprising a base, a horizontal turret rotatable on said base counter to the direction of rotation of said ware carrying element, a plurality of spaced pairs of transfer arms pivoted on radially spaced centers near the periphery of said turret, each said pair of transfer arms including a leading arm and a trailing arm adapted to assume open and closed positions relative to each other and uphold ware received therebetween when closed, a dead plate cooperating with each said pair of arms for resting said received ware thereon during transfer, means for normally maintaining each said pairs of transfer arms closed, means actuable for opening each said pair of transfer arms responsive to predetermined spaced positions of rotation during each revolution of said turret to sequentially receive ware from said ware carrying element and release it to said conveyor, and separate auxiliary means actuable intermediate the said ware releasing and ware receiving positions for closing each said pair of transfer arms prior to engagement of said means actuable to open said arms at the ware receiving position, whereby to insure closing each said pair of arms and eliminate interference with the ware carrying element as they approach the ware receiving position.

8. The combination defined in claim 7, wherein said auxiliary means comprises a cam follower carried by the trailing arm of each said pair of transfer arms and a cam engagable therewith after said trailing arm has cleared the ware deposited at the ware releasing position and before each said pair of arms reaches its ware receiving position.

9. Glassware transfer apparatus carried by a continuously rotating turret and adapted to receive ware from a continuously rotating ware carrying element at a ware receiving position and release it to a straight-line conveyor at a ware releasing position comprising a pair of rotatable transfer arms pivotally connected on said turret and extending horizontally outwardly therefrom to assume open and closed positions, said arms, when closed, adaptable for upholding glassware received therebetween, means for normally maintaining said pair of transfer arms in closed position, and means opposing said closing means for opening each said pair of transfer arms, said last-mentioned means including a first cam and cam follower engageable to open both arms of said pair of transfer arms proximate to said ware receiving and releasing positions, and an overlapping cam and cooperating cam follower on each pair of transfer arms, the latter being independent of said first cam and cam follower and engageable after engagement of said first cam and cam follower proximate to said ware releasing position to open the trailing arm of each said pair of transfer arms beyond the opening movement provided by said first cam and cam follower to clear the released ware by said trailing arm, thereby permitting spacing one to the other between the released ware on the conveyor less than peripheral spacing between ware carried by said transfer arms.

10. A continuously rotating ware transfer mechanism adapted to receive ware from a continuously rotating ware carrying element and released to a conveyor, said transfer mechanism comprising a base, a horizontal turret rotatable on said base counter to the direction of rotation of said ware carrying element, a plurality of spaced pairs of transfer arms pivoted on radially spaced centers near the periphery of said turret, each said pair of transfer arms including a leading arm and a trailing arm adapted to assume open and closed positions relative to each other and uphold ware received therebetween when closed, a dead plate cooperating with each said pair of arms for resting said received ware thereon during transfer, means for normally maintaining each said pairs of transfer arms closed, means actuable for opening each said pair of transfer arms responsive to predetermined spaced positions of rotation during each revolution of said turret to sequentially receive ware from said ware carrying element and release it to said conveyor, a cam mounted on said base, a cam follower operatively connected to said trailing arm and engageable with said cam when the ware is released to the conveyor, said cam overlapping the opening movement of the last-mentioned means so that it pivots each said trailing arm opposite the direction of rotation of the turret to increase opening movement of said trailing arm beyond the normal opening movement provided by the said last-mentioned means, whereby the released ware may be carried by the conveyor away from the transfer point at a linear speed slower than the linear speed of the ware carried by the transfer arms.

11. Apparatus for transferring glassware received at a predetermined ware receiving position to a predetermined ware releasing position for delivery thereat to a conveying means traveling at a reduced speed, said apparatus comprising a base, a horizontal turret continuously rotatable on said base, a plurality of spaced pairs of transfer arms pivoted horizontally on radially spaced centers near the periphery of said turret, each said pair of transfer arms including a leading arm and a trailing arm adapted to assume open and closed positions relative to each other, and each said pair of transfer arms adapted to uphold glassware therebetween when closed, means for normally maintaining each said pair of transfer arms closed, a first cam follower mounted on an integral extension of each leading arm radially inwardly of its pivot, means operatively connecting each said extension and the trailing arm whereby opening movement of said leading arm will transmit a like opening movement to the corresponding trailing arm, a first stationary cam engageable with the first cam followers for actuating them during rotation of the turret to overcome said means for closing each pair of transfer arms and receive and release glassware, a second cam follower for each pair of transfer arms, a corresponding linkage for each said second cam follower operatively connected at one end thereto and its other end pivotally connected to the trailing arm of the same pair of transfer arms, said linkage being adapted to actuate said trailing arm independently to overcome said means for closing the pair of transfer arms, and a second stationary cam engageable with each said second cam follower for actuating its linkage during rotation of the turret after glassware is released by engagement of the first cam and the corresponding first cam follower for pivoting said trailing arm only beyond the opening movement provided by said first cam and corresponding cam follower.

12. In a rotary glassware transfer mechanism having a turret pivotally mounting a plurality of pairs of transfer arms for opening and closing movement and each having means for normally maintaining the said pairs of arms closed and cooperating means for collectively opening each said pair of arms proximate ware receiving and ware releasing positions during rotation of the turret, the improvement for releasing received ware to a conveyor traveling across the releasing position at a speed less than the linear speed of the ware carried by each said pair of arms to the releasing position, said improvement comprising arm actuating means mounted near the periphery of the turret for each pair of transfer arms, and operatively connected to each trailing arm of said pair of arms, said means adapted for independently actuating its trailing arm in an opening direction only, and means for operating said arm actuating means after received ware is released at the ware releasing position to open the trailing arm further beyond the ware releasing opening movement sufficiently to slow the speed of the trailing arm to at least the speed of the released ware carried on the conveyor.

References Cited in the file of this patent

UNITED STATES PATENTS

| | | |
|---|---|---|
| 1,245,730 | Johnson et al. | Nov. 6, 1917 |
| 2,112,119 | Rowe | Mar. 22, 1938 |

FOREIGN PATENTS

| | | |
|---|---|---|
| 316,064 | Germany | Nov. 20, 1919 |